United States Patent [19]

Carlson

[11] Patent Number: 5,579,582
[45] Date of Patent: Dec. 3, 1996

[54] PUZZLE COOKIE CUTTER

[76] Inventor: Ethel G. Carlson, HC 1. Box 120, Ryder, N. Dak. 58779

[21] Appl. No.: 360,986

[22] Filed: Dec. 20, 1994

[51] Int. Cl.$^6$ ........................................ B26B 3/04
[52] U.S. Cl. ............................. 30/299; 30/301; 30/315; 30/316
[58] Field of Search ................. 30/299, 302, 303, 30/304, 305, 314, 315, 316, 329, 114, 301; 83/698.71, 698.91; D7/672, 675, 676

[56] References Cited

U.S. PATENT DOCUMENTS

| | | | |
|---|---|---|---|
| D. 161,919 | 2/1951 | Gorko | D7/672 |
| D. 240,288 | 6/1976 | Wright | D7/672 |
| D. 290,570 | 6/1987 | Virk | D7/672 |
| 337,329 | 3/1886 | Hewett | D7/672 X |
| D. 345,898 | 4/1994 | Aiken et al. | D7/676 |
| 825,775 | 7/1906 | Stumpf | D7/676 X |
| 986,286 | 3/1911 | Hartmann . | |
| 1,477,693 | 12/1923 | Clark | D7/672 X |
| 2,119,260 | 5/1938 | Valle | 30/316 X |
| 2,775,523 | 12/1956 | Green . | |
| 2,876,714 | 3/1959 | Brown | 30/316 |
| 3,128,724 | 4/1964 | Linder | 30/314 X |
| 3,234,895 | 2/1966 | Leiby | 30/315 X |
| 4,327,489 | 5/1982 | Conrad | 30/299 |
| 4,424,601 | 1/1984 | Weber | 30/302 X |
| 4,431,395 | 2/1984 | Babos . | |
| 4,442,604 | 4/1984 | Altman | 30/302 |
| 4,452,419 | 6/1984 | Saleeba . | |
| 4,818,207 | 4/1989 | Heron | 30/315 X |
| 4,943,063 | 7/1990 | Moreu . | |
| 5,172,622 | 12/1992 | Sabin | 83/698.71 X |

FOREIGN PATENT DOCUMENTS 2703900  8/1978  Germany .

Primary Examiner—Eugenia Jones
Attorney, Agent, or Firm—Richard C. Litman

[57] ABSTRACT

A puzzle cookie cutter includes a cutting die holder and at least one cutting die removably securable in the holder. The die or dies provide for the cutting of cookie dough, batter, or the like into several separate, irregularly shaped and sized interfitting pieces, which pieces may be reassembled as a puzzle after baking to provide entertainment for the consumer of the cookie. The dies may be provided in virtually any regular or irregular geometric shape, animal or other caricature or representation, and/or any alphanumeric character, as desired. The die or dies may also provide for the spaced apart separation of the cut dough or batter, to allow for expansion or flow of the batter or dough during the baking process, in order that the baked pieces will have a close fit with one another without interference. The cut pieces may be baked adjacent one another on a sheet or pan and decorated after the baking process as desired, then separated randomly to provide a challenge akin to that of the assembly of a relatively simple jigsaw or picture puzzle, in addition to the enjoyment of eating the baked cookie pieces.

1 Claim, 3 Drawing Sheets

PUZZLE COOKIE CUTTER

FIELD OF THE INVENTION

The present invention relates generally to cooking and baking implements, and more specifically to a cookie cutter having interchangeable cutting dies, with the dies each providing for the cutting of a plurality of interlocking pieces, as in a jigsaw puzzle or the like. The resulting cookie dough pieces may be reassembled as desired after baking, providing entertainment for the consumers thereof.

BACKGROUND OF THE INVENTION

Contrary to the nearly universal admonishments of parents telling their children not to play with their food, many foods have traditionally been prepared to have a pleasing and attractive appearance which encourages interest in the food, if not actual manipulation. This is particularly true of desserts and sweets of various sorts, and decorated cakes and the like are well known for festive occasions. Canapes, hors d'oeuvres, etc. are also commonly presented in an attractive array, which often encourages consumers thereof to inspect closely, if not actually manipulate, the food.

Most people also enjoy at least some minor mental challenge or activity, e.g., the assembly of a puzzle or the like. While picture puzzles having several hundred pieces and requiring hours of time to complete are beyond the scope of the present invention, persons preparing to have a meal or snack still generally find some time for relatively minor mental diversion. Many restaurants recognize this, and provide at least children's place mats with mazes, puzzles and the like imprinted thereon.

The present invention addresses both of the above aspects, by providing a puzzle cookie cutter having interchangeable dies for the cutting of cookie dough or the like, into a plurality of interlocking puzzle pieces. The pieces may then be baked conventionally, and distributed to children or other consumers. The consumers may reassemble the various cookie puzzle pieces to reform the pattern provided by the cutting die, prior to consuming the cookie puzzle. The interchangeable dies may have virtually any overall form, from simple geometric shapes, to animal and other caricatures of various sorts, to alphanumeric characters, if desired. The cookie puzzle pieces may be reassembled after baking for decoration, if desired, then disassembled before offering them to the consumer.

DESCRIPTION OF THE PRIOR ART

U.S. Pat. No. 986,286 issued to Charles F. Hartmann on Mar. 7, 1911 discloses a Baking Apparatus comprising a baking pan which also serves as a cutting die for cookie dough or the like. The die or cutting portion is apparently removable from the underlying pan or baking sheet, with the dough being placed on the sheet and then cut with the die. The die, however, remains in place during baking, and serves to preclude the spreading of the cut pieces during baking in order to provide accurate assembly of the pieces. The present invention is not used during the actual baking process, but only as a cookie cutter or die; no baking pan is provided as a part of the present invention. Different means are provided by the present cookie cutter to allow for the spread of the dough during baking. Moreover, the present invention provides interchangeable dies, unlike the Hartmann apparatus.

U.S. Pat. No. 2,775,523 issued to Madelyne L. Green on Dec. 25, 1956 discloses a Decorative House formed of a series of interlocking baking pans. The dough or batter is formed within each of the pans, and the food is cooked within the pans. The pans are then assembled with the baked goods disposed to the outside, to form the appearance of a gingerbread house or the like. The baking pan thus does not serve to cut the dough or the like, but rather serves as a baking utensil and as a structural element for the completed three dimensional structure. The present invention operates strictly as a cutting device for the dough or batter, and is not intended to be heated during baking operations or to provide support for the baked goods after baking.

U.S. Pat. No. 4,431,395 issued to George B. Babos on Feb. 14, 1984 discloses a Gingerbread House Apparatus similar to the apparatus of the Green patent discussed immediately above. Again, the apparatus is used to bake the goods, as well as to form them prior to baking. The pans are removed prior to assembly of the three dimensional structure, however. One problem which is not addressed by any of the above prior art, is that of differential heat conduction of the various edge elements of the above devices. For example, it is noted that Babos provides for additional door and window cutouts, which cutting dies are baked along with the remainder of the baking apparatus. Cooking times and temperatures are generally devised to bake the majority of the goods uniformly, and it is recognized that exposed edges, or edges in contact with heated surfaces (e.g., a window cutout remaining in the dough during baking) will cause those portions of the goods to be overheated in comparison to the center. The present invention avoids this problem, by precluding use during the actual baking.

U.S. Pat. No. 4,452,419 issued to Burvelle E. Saleeba on Jun. 5, 1984 discloses a Modular Cake Pan including a plurality of inserts therefor which may be arranged as desired to form alphanumerical patterns. The cake batter is poured into the form and the form removed after baking, to provide a single baked good having an alphanumeric form. No means are provided for producing a plurality of baked goods which are assembleable into a completed whole, as with the present puzzle cookie cutter. Moreover, the device acts as a cooking or baking pan or container, with the goods remaining in the device during the baking process, unlike the present invention.

U.S. Pat. No. 4,943,063 issued to Claude R. M. Moreau on Jul. 24, 1990 discloses a Convertible Comestible comprising a plurality of molded edible pieces which may be assembled to form a three dimensional representation or model of an object. No mold, cutting die, or other forming means is disclosed, but the three dimensional shapes and the implication of molded goods, would preclude the use of cutting dies for the formation of the goods and would require the molds to be in place during the curing process, unlike the present invention.

Finally, German Patent No. 2,703,900 to Gebr. Hack Feinbackwaren and published on Aug. 3, 1978 discloses a form for a gingerbread house or the like, similar to that produced using the Hartmann, Green or Babos devices discussed above. No interlocking shapes are disclosed, nor are any interchangeable cutting dies disclosed, as provided by the present invention.

None of the above noted patents, taken either singly or in combination, are seen to disclose the specific arrangement of concepts disclosed by the present invention.

SUMMARY OF THE INVENTION

By the present invention, an improved puzzle cookie cutter is disclosed.

Accordingly, one of the objects of the present invention is to provide an improved puzzle cookie cutter which includes at least one cutting die which provides for the cutting of cookie dough, batter or the like into a plurality of separate interlocking pieces of different shapes and sizes, which pieces may be reassembled as a puzzle after baking.

Another of the objects of the present invention is to provide an improved puzzle cookie cutter which includes a single die holder apparatus and a plurality of interchangeable dies removably installable therein.

Yet another of the objects of the present invention is to provide an improved puzzle cookie cutter which die or dies include means providing for an allowance for expansion of the pieces cut thereby during the baking process, in order for the baked pieces to fit closely with one another without interference.

Still another of the objects of the present invention is to provide an improved puzzle cookie cutter which die or dies may be in the form of regular or irregular geometric shapes, animal and/or other caricatures or representations, and/or different alphanumeric characters, as desired, and which die or dies provide for the cutting of such shapes and characters into a plurality of separate pieces requiring reassembly after baking to form a completed shape.

A final object of the present invention is to provide an improved puzzle cookie cutter for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENTS

Figure 1:
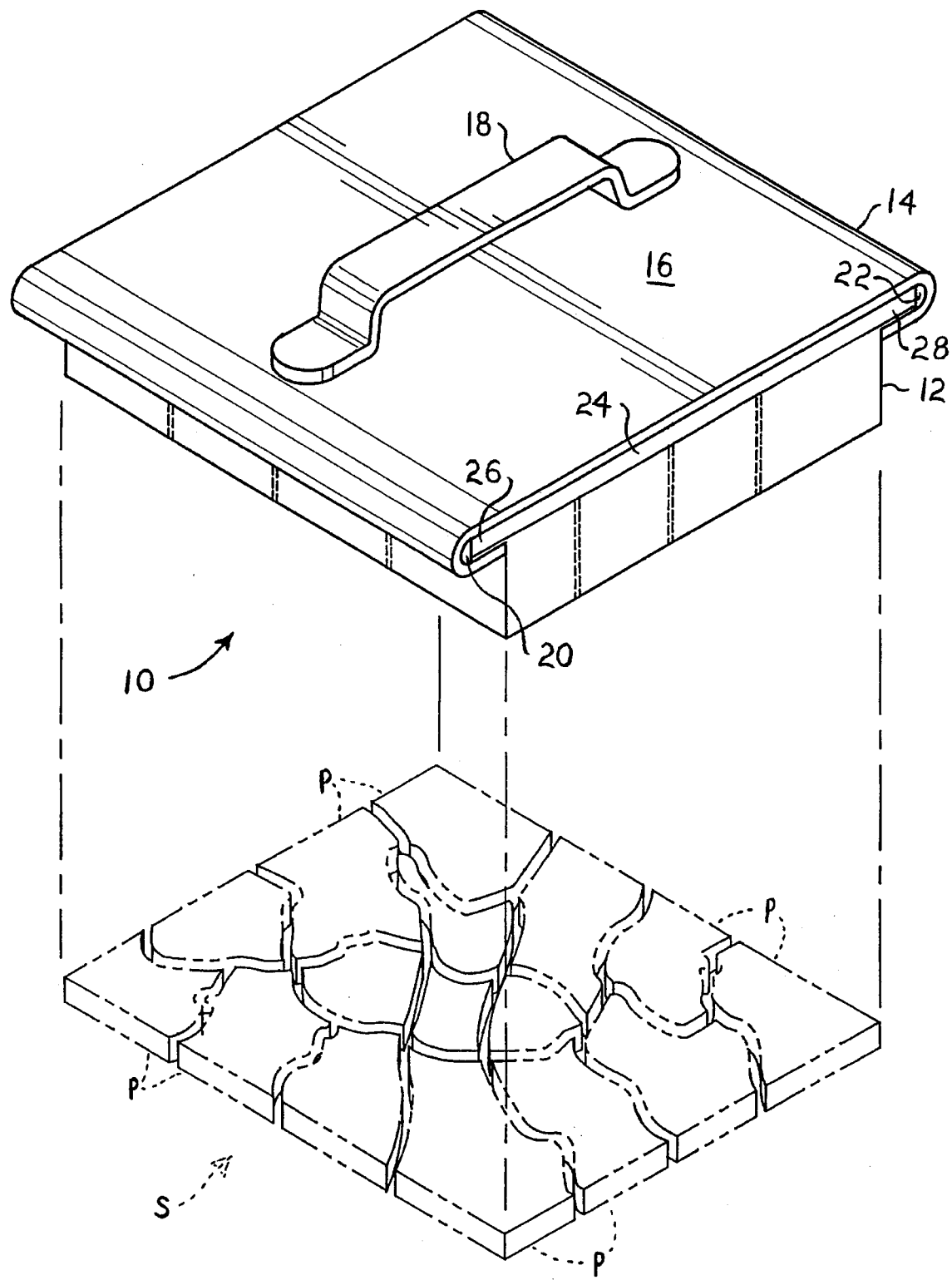
FIG. 1 is a top perspective view of a puzzle cookie cutter of the present invention, showing the holder thereof and a rectangular die therein, and an exemplary cookie puzzle cut from the die.

Referring now particularly to FIG. 1 of the drawings, the present invention will be seen to relate to a puzzle cookie cutter 10, which provides for the cutting of a sheet S of cookie dough, batter, or other like materials into a plurality of interfitting puzzle-like pieces P. The various pieces P may then be decorated if desired, separated and baked, and then provided to persons for reassembly (if desired) and consumption. The cookie cutter 10 comprises a cutting die portion 12 and a cutting die holder portion 14, with the cutting die portion 12 preferably being removably installable to the holder portion 14. The holder portion 14 will also be seen to have an upper surface 16, which surface 16 may have a handle 18 extending therefrom.

The upper surface 16 of the cutting die holder portion 14 of FIG. 1 includes opposite first and second channels 20 and 22 extending therefrom, and the cutting die portion 12 includes an upper surface 24 with opposite first and second edges 26 and 28 extending therefrom. The spacing between the holder portion channels 20 and 22 is equal to the distance between the edges 26 and 28 of the cutting die portion 12 upper surface 24, thus allowing the cutting die portion 12 to be installed removably to the holder portion 14, with the holder portion channels 20 and 22 capturing the opposite edges 26 and 28 of the cutting die portion 12 respectively therein. This means of securing the cutting die portion 12 to the holder portion 14, precludes contact of the relatively wide channel portions with the underlying cookie dough sheet S during cutting, thus facilitating cutting of the sheet S by means of contact solely with the relatively thin cutting blades of the cutting die portion 12.

Figure 2:
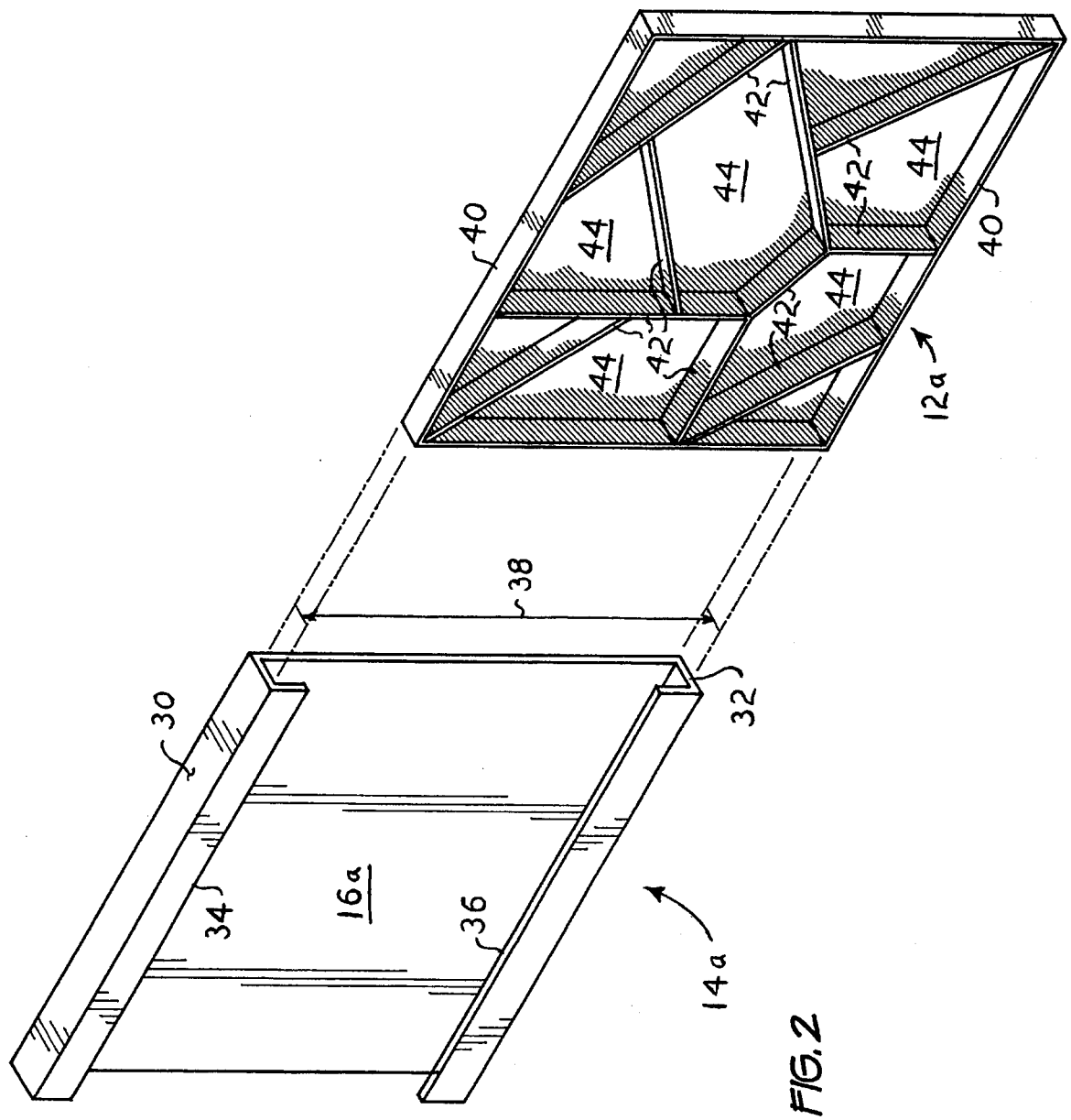
FIG. 2 is a bottom perspective view of a cookie cutter die holder and die removed therefrom, showing another means for securing the die within the holder and an exemplary die pattern.

An alternative means of providing for the interchangeable attachment of the die portion and die holder portion is shown in FIG. 2. In FIG. 2, an alternative cutting die holder 14a includes opposite first and second flanges 30 and 32 extending downwardly from opposite edges of the upper surface 16a (seen from the underside in FIG. 2). Each of the flanges 30 and 32 includes an inwardly extending edge, respectively 34 and 36. The accompanying cutting die portion 12a has a cutting blade portion width 38 which is equal to the spacing between the two opposite flanges 30 and 32 of the holder portion 14a, and cutting blades and walls 40 which are equal in height to the height of the two flanges 30 and 32. Thus, a cutting die portion so configured, e.g., cutting die 12a, may be slidably installed between the flanges 30 and 32 of the accompanying holder portion 14a for use therewith. It will be noted, however, that the relatively wide inwardly extending edges 34 and 36 of the holder portion 14a may preclude ease of penetration of the cutting holder and cutting die assembly into relatively stiff doughs or the like; thus, the cutting die retention arrangement of FIG. 1 may be preferable, depending upon the materials to be cut.

Either of the above arrangements will be seen to provide for the interchangeability of compatible cutting dies 12/12a with their respective holders 14/14a, as desired. Thus, the present invention may comprise not only a single die and accompanying holder, but may include several dies of different configurations which may be interchangeably installed to the holder portion as desired. Accordingly, the resulting cookie pieces may have any one of a number of different interfitting shapes and sizes, depending upon the specific die chosen.

FIG. 2 also provides a view of an exemplary cutting blade arrangement, as shown in the cutting die 12a. A plurality of cutting blades 42 are provided within the cutting die 12a, which blades 42 are each straight and are interconnected with one another to run in various directions. The irregularly shaped polygonal areas 44 defined by these interconnected cutting blades 42 provide a plurality of like shaped cookie dough pieces after cutting, which pieces may then be decorated (if desired) and then separated for baking. After baking, the consumer(s) of the cookie are offered the additional challenge of reassembling the baked pieces (with decorative design, if applied) prior to consuming the cookie.

It will be seen that the cutting blades may take on virtually any pattern of regular or irregular shapes, with straight or curved sides or a combination thereof, etc. The pattern of cookie pieces P shown in FIG. 1 will be seen to reflect the irregular pattern of the cutting blades (not shown) of the puzzle cookie cutter of FIG. 1. Additionally, it will be seen that the cutting dies provided may have virtually any shape desired, such as the square or rectangular shape of the dies 12 of FIG. 1 and 12a of FIG. 2, or the circular die of FIG. 4, discussed further below. Other shapes depicting human, animal, or fictional caricatures, as well as alphanumeric characters, geographical shapes, shapes of various objects, etc., may be used in the manufacture of the puzzle cookie cutter dies of the present invention, as desired. The precise configuration of the blades within the dies is independent of the external shape of the dies, and may comprise a plurality of regular and/or irregular, straight and/or curved blades within a given die. The interchangeability of various dies with a common holder provides versatility for virtually any festive occasion.

It is known in baking that generally free form doughs, batters and the like tend to expand during the baking process, due to the release of carbon dioxide gas from the rising process. This causes the edges of cut dough patterns to flow outwardly, if only slightly. Prior art means for providing precise sizes and shapes for baked goods, rely upon baking pans or forms having walls to contain the dough, batter or other material during baking. This is cumbersome and time consuming in the baking of a relatively large number of similar objects (e.g., cookies), as opposed to perhaps one larger object (e.g., gingerbread house). Generally, at least a few batches of cookies are prepared at a given time, and if a baking mold is used, then at least a few identical molds would be required during the baking process—or only one baked good could be baked at a time, if only one mold were provided. Additionally, it will be seen that no cutting or preparing of the unbaked dough could be accomplished, if the mold(s) were in use in the oven during the baking process. The direct contact of the mold wall with the baked goods also effects the consistency of the baked product, due to the heat transfer of the mold wall to the edge of the product during baking.

The present invention overcomes this problem of expansion of goods during baking, by providing an expansion allowance during the cutting process. Thus, the unbaked material may be cut and laid out on the baking sheet or pan and baked, with the additional space provided during the cutting process serving to allow for expansion. The exact space required during baking will be seen to depend upon the specific consistency and viscosity of the dough or batter used, the baking time, the amount of baking powder/baking soda used, etc., and may be adjusted as desired.

Figure 3:
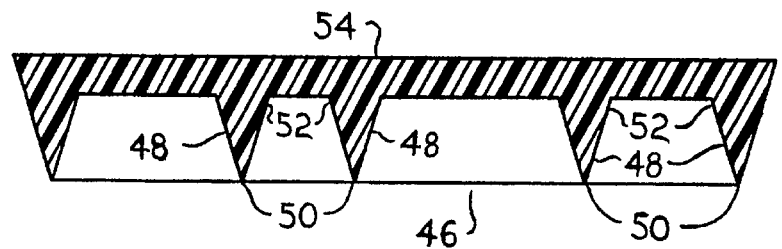
FIG. 3 is a side view in section of an alternate cutting die, showing one means for separating or spacing apart the cut cookie dough or batter to allow for expansion during baking or other cooking or processing operation.

FIG. 3 provides a side view in section of a cutting die 12b, which provides one means of providing separation between cut dough or material pieces. The die 12b of FIG. 3 includes an open bottom 46 and a plurality of cutting blades 48 therein, each of which includes a relatively sharp and thin lower edge or apex 50, providing an efficient cutting edge. However, the opposite, upper edges 52 are considerably thicker at the points where they join the underside of the overlying upper surface 54 of the die 12b. Thus, each of the blades 48 comprises a triangular cross section, which tends to push the peripheries of the cut pieces of cookie dough or other material, upward and inward toward the center of the respective cut pieces. Each of the adjacent cut pieces will thus have a triangular cross section gap therebetween, with the pieces each being immediately adjacent only at their extreme bottom surfaces. As the cookie pieces will tend to expand upwardly, as well as outwardly, the cutting die 12B of FIG. 3 will be adequate for many types of cookies and the doughs from which they are formed.

The above construction of the cutting die 12b offers another advantage, in that the relatively thick upper portions 52 of the cutting blades 48 provide sufficient structural strength for the die 12b to be formed of relatively soft materials, e.g., plastics of various sorts, etc. As the present invention is not adapted for use in the oven during the baking process, plastics are quite suitable for use in the manufacture of the present invention, particularly the die 12b configuration shown in FIG. 3 and discussed above. Alternatively, thin sheet metal (stainless steel, aluminum, etc.) may be used for dies of the present invention requiring relatively thin surfaces and walls.

Figure 4:
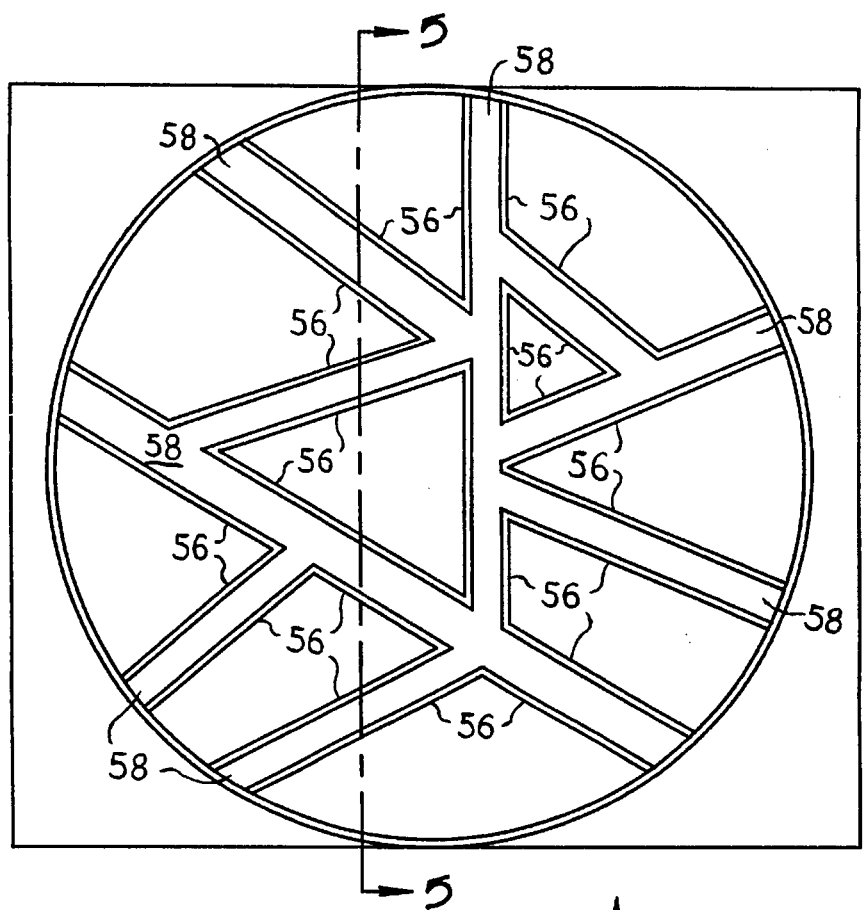
FIG. 4 is a bottom plan view of a circular cutting die, showing another means for spacing the cut cookie dough, by including a channel between each of the pieces.
Figure 5:
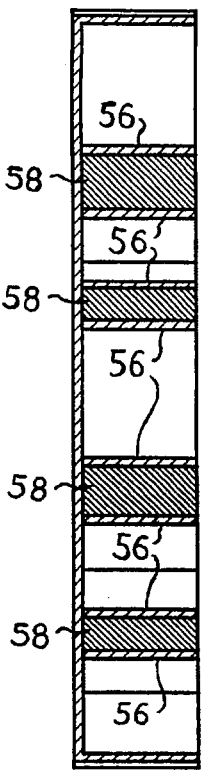
FIG. 5 is a side view in section along line 5—5 of FIG. 4, showing the separation of the various die segments and the channels therebetween.

An alternative means of providing the spacing between cut dough pieces is shown in FIGS. 4 and 5. In the bottom plan view of FIG. 4, it will be seen that each of the proximate cutting blade walls 56 of the cutting die 12c which serve to cut adjacent material pieces, are separated by a channel 58 therebetween in order to preclude the resulting cut pieces from lying immediately adjacent and in direct contact with one another. Thus, when the various dough or other material cookie puzzle pieces are cut with the cutting die 12c of FIGS. 4 and 5, a relatively narrow (e.g., ¼ inch, more or less) strip of dough or material will be defined by the channel 58 between proximate blade portions 56. This strip may be removed from between the cut pieces, with the resulting gap between cut pieces serving to allow for expansion of the pieces during baking to allow their subsequent reassembly without interference due to their increased size from expansion during the baking process. FIG. 5 provides a side view in section of the cutting die 12c of FIG. 4.

In summary, the present invention will be seen to provide a novel means of cutting and shaping doughs, batters and the like prior to baking, in order to provide a plurality of interfitting edible puzzle pieces after the pieces are baked. The cutting dies of the puzzle cookie cutter may be interchangeable with a common holder, to provide dies for cutting pieces of virtually any desired shapes and sizes, according to the particular die. The dies may have an overall peripheral shape of virtually any sort, from simple square and circular shapes to that of various caricatures and objects, as desired. Alphanumeric characters (letters of the alphabet and numbers) may be used, if desired, with the cookie puzzle piece being used to form the appropriate shape after baking.

As baked goods typically expand during the baking process, the present puzzle cookie cutter invention may also include means to allow for the expected expansion of the cookie puzzle pieces during baking, in order that the baked pieces may be reassembled after baking without interference due to their increased size. The cutting dies may have cutting blades (and cutting die walls) having a relatively thick upper portion, to provide a triangular cross section thereby to push the raw material aside during cutting. The resultant space between the upper peripheries of the cut pieces serves to allow for upward and outward expansion of the material during baking. Alternatively, the die(s) may have a space or channel between otherwise adjacent cutting blades, resulting in a finite gap between pieces after cutting and removing the material defined by the channel during cutting.

As the dies are used only for cutting the raw material prior to baking, and not as baking molds to hold the shape of the pieces during the baking process, they may be formed of plastic or other materials which are not particularly heat resistant, if desired, particularly in the case of a die of the FIG. 3 configuration.

After baking, the cookie puzzle pieces may be left in their assembled state, as they were removed from the cutting die prior to baking, and decorated if desired for further effect. The pieces may then be randomly rearranged, with the implied or explicit challenge to the consumer to reassemble the cookie puzzle pieces prior to their consumption. The above described invention will be seen to provide additional entertainment over and above that normally enjoyed by eating such baked goods and sweets, with the additional challenge of puzzle assembly providing a popular pastime at festive and other occasions.

It is to be understood that the present invention is not limited to the sole embodiments described above, but encompasses any and all embodiments within the scope of the following claims.

I claim:

1. A puzzle cookie cutter comprising:

a cutting die holder having an upper surface and a lower surface, said cutting die holder including a handle extending from said upper surface;

flanges depending from said cutting die holder lower surface; and a cutting die including, a base removably secured to the lower surface of said cutting die holder by said flanges, a plurality of cutting blades depending an equal distance from said base, said plurality of cutting blades defining a plurality of interfitting adjacent configurations which collectively form an outline of a puzzle, each of the interfitting configurations being of a different shape, and a plurality of channels each formed between adjacent ones of said cutting blades;

whereby said cutting blades of said cutting die are forced into a sheet of cookie dough by said cutting die holder to form a plurality of interfitting puzzle piece cookies with said channels serving to separate the cookies to provide allowance for expansion of the dough during baking.

* * * * *